US011518292B2

(12) United States Patent
Hop (10) Patent No.: US 11,518,292 B2
(45) Date of Patent: Dec. 6, 2022

(54) TOY HAULER TRAILER DETACHABLY ATTACHED AT VEHICLE

(71) Applicant: HOP FAMILY INVESTMENTS LLC, Hudsonville, MI (US)

(72) Inventor: Dean Hop, Hudsonville, MI (US)

(73) Assignee: HOP FAMILY INVESTMENTS LLC, Hudsonville, MI (US)

(*) Notice: Subject to any disclaimer, the term of this patent is extended or adjusted under 35 U.S.C. 154(b) by 924 days.

(21) Appl. No.: 16/365,755

(22) Filed: Mar. 27, 2019

(65) Prior Publication Data

US 2019/0308546 A1 Oct. 10, 2019

Related U.S. Application Data

(60) Provisional application No. 62/652,474, filed on Apr. 4, 2018.

(51) Int. Cl.
*B60P 3/06* (2006.01)
*B60P 1/43* (2006.01)
*B60D 1/54* (2006.01)
*B62D 63/08* (2006.01)
*B60P 3/32* (2006.01)

(52) U.S. Cl.
CPC .................. *B60P 3/06* (2013.01); *B60D 1/54* (2013.01); *B60P 1/435* (2013.01); *B60P 3/32* (2013.01); *B62D 63/08* (2013.01)

(58) Field of Classification Search
CPC ...... B60P 3/06; B60P 3/10; B60P 3/32; B60P 1/435; B60P 1/054; B62D 63/061; B62D 63/08
See application file for complete search history.

(56) References Cited

U.S. PATENT DOCUMENTS

| 4,859,982 A | 8/1989 | Seaburg |
| 5,653,566 A * | 8/1997 | Williams ................. B60P 3/10 414/800 |
| 5,666,103 A | 9/1997 | Davis, Jr. |
| 6,100,801 A | 8/2000 | Plummer |
| 6,135,532 A | 10/2000 | Martin |

(Continued)

FOREIGN PATENT DOCUMENTS

| CA | 3038154 A1 * 10/2019 ............... B60D 1/54 |
| DE | 202021103787 U1 * 9/2021 |

(Continued)

*Primary Examiner* — Kaitlin S Joerger
(74) *Attorney, Agent, or Firm* — Honigman LLP (57) ABSTRACT

A trailer system for a vehicle includes a trailer having a trailer body, wheels, and a trailer tongue for hitching the trailer to a towing vehicle. A rear end of the trailer body is pivotally and detachably attachable at a rear of the vehicle. When attached at the rear of the vehicle, the trailer is pivotable between a stowed position, where the trailer is vertically oriented along the rear of the vehicle, and a lowered position, where the trailer is lowered such that the wheels are at the ground. When attached at the rear of the vehicle and in the stowed position, the front end of the trailer body is at or near an upper region of the vehicle. When attached and in the lowered position, the trailer functions to allow items to be unloaded from the vehicle and onto the trailer body.

20 Claims, 9 Drawing Sheets

(56) References Cited

U.S. PATENT DOCUMENTS

| | | | |
|---|---|---|---|
| 6,722,726 B1 * | 4/2004 | Parmer | B60P 3/06 |
| | | | 296/26.02 |
| 6,899,375 B2 | 5/2005 | Sankrithi et al. | |
| 7,147,268 B2 | 12/2006 | Winter | |
| 7,484,749 B1 * | 2/2009 | Doyle | B60D 1/66 |
| | | | 280/460.1 |
| 7,487,993 B2 | 2/2009 | Tai | |
| 7,618,085 B1 | 11/2009 | Bean | |
| 7,823,901 B2 * | 11/2010 | Waddell | B62D 63/061 |
| | | | 280/491.1 |
| 8,052,191 B2 | 11/2011 | Shea | |
| 2005/0074318 A1 | 4/2005 | Howard | |
| 2005/0281649 A1 * | 12/2005 | Friesenhahn, Sr. | |
| | | | A01M 31/025 |
| | | | 414/482 |
| 2006/0008343 A1 * | 1/2006 | Howard | B60P 3/341 |
| | | | 414/498 |
| 2006/0238317 A1 | 10/2006 | Colledge | |
| 2009/0212515 A1 | 8/2009 | Oyasaeter | |
| 2016/0339826 A1 | 11/2016 | Buri | |
| 2020/0290413 A1 * | 9/2020 | Peyton | B60D 1/06 |

FOREIGN PATENT DOCUMENTS

| | | | | |
|---|---|---|---|---|
| GB | 2375082 A | * | 11/2002 | B60P 3/06 |
| GB | 2410221 A | * | 7/2005 | B60P 1/6481 |
| WO | 2009156727 A1 | | 12/2009 | |
| WO | WO-2018191037 A1 | * | 10/2018 | B60D 1/54 |

* cited by examiner

TOY HAULER TRAILER DETACHABLY ATTACHED AT VEHICLE

CROSS REFERENCE TO RELATED APPLICATION

The present application claims the filing benefits of U.S. provisional application Ser. No. 62/652,474, filed Apr. 4, 2018, which is hereby incorporated herein by reference in its entirety.

FIELD OF THE INVENTION

The present invention relates generally to a recreational vehicle, such as a fifth wheel or motorhome or cargo trailer and, more particularly, to a recreational vehicle having a toy hauler feature.

BACKGROUND OF THE INVENTION

It is known to include a "toy hauler" section at the rear of a fifth wheel trailer. The toy hauler section provides a separate rear room or compartment of the fifth wheel trailer in which to store ATVs or motorcycles or other relatively small vehicles or the like while driving along a road. When at a destination location, such as a camp site or the like, the rear of the toy hauler section is opened and the "toys" can be unloaded via a ramp at the rear of the fifth wheel trailer.

SUMMARY OF THE INVENTION

The present invention provides a toy hauler trailer that is pivotally mounted at the rear of a fifth wheel trailer or recreational vehicle (RV) or cargo trailer, such as at the rear of a toy hauler section of the fifth wheel or RV. A rear end of the toy hauler trailer is pivotally mounted at the lower rear of the fifth wheel or RV and is pivoted to an upright position so as to be disposed generally vertically at and along the rear of the fifth wheel or RV. The front end of the trailer includes a trailer towing tongue or hitch portion that may be folded along the trailer body when the trailer is in its vertical stowed or traveling orientation. Thus, when the trailer is stowed at the rear of a vehicle (fifth wheel or RV or the like), the trailer is disposed at and along the vehicle, and may function as a rear door or panel of the vehicle.

When the fifth wheel or RV (or any suitable recreational or cargo trailer or vehicle) is parked at a destination location, the trailer may be pivoted downward so that its wheels rest on the ground, whereby ATVs or other vehicles in the toy hauler section of the fifth wheel or RV may be driven or wheeled out onto the trailer. The tongue of the trailer may be pivoted or otherwise extended from the front of the trailer body, so that a towing vehicle (such as the towing vehicle or pickup truck that was towing the fifth wheel) may have the trailer hitched thereto, whereby the trailer may be disconnected from the fifth wheel or RV and towed away by the towing vehicle.

The present invention thus provides a convenient means for transporting a trailer for ATVs or the like that may be stowed in a toy hauler section of a fifth wheel (or other trailer or vehicle) during travel to a destination. The trailer system of the present invention also provides an enhanced means for unloading ATVs or the like from the toy hauler section and transporting the ATVs or the like from the location where the fifth wheel is parked to a location where the ATVs may be used.

These and other objects, advantages, purposes and features of the present invention will become apparent upon review of the following specification in conjunction with the drawings.

DESCRIPTION OF THE PREFERRED EMBODIMENTS

Referring now to the drawings and the illustrative embodiments depicted therein, a recreational vehicle 10 (such as a fifth wheel trailer or motor home or the like) has a toy hauler trailer 12 pivotally mounted at the rear of the fifth wheel 10 (FIGS. 1-5). The trailer 12 is pivoted from a stowed position (FIGS. 1 and 2) toward a ramp position (FIG. 4) and/or a use position (FIG. 5), as discussed below. The trailer system of the present invention provides enhanced loading and unloading of vehicles or items 14 (such as ATVs or motorcycles or the like) at a toy hauler section of the fifth wheel 10, as also discussed below. The fifth wheel is towed by a towing vehicle 16, such as a pickup truck or the like, which attaches at a forward portion of the fifth wheel, such as in a known manner (see FIGS. 1, 3 and 4).

As shown in FIGS. 1-5, the toy hauler trailer 12 has a trailer body 12a (such as a platform or the like on which the ATVs and/or other items may be placed) having a rear end 12b and a front end 12c. The rear end 12b is pivotally attached at the lower rear of the vehicle 10 and the front end 12c has a trailer tongue 12d adjustably disposed thereat. Wheels and tires 12e are mounted at an axle at the trailer body 12a.

The rear end 12b of the toy hauler trailer 12 is pivotally attached at a pivot joint 18 at the rear of the fifth wheel. For example, the pivot joint may comprise cylindrical hinge elements at each of the rear end 12b of the trailer and the rear of the fifth wheel 10, whereby one or more pins are inserted through the hinge elements when aligned to secure the trailer at the fifth wheel. Thus, the trailer may be readily attached at the rear of the fifth wheel by backing the trailer to the fifth wheel and inserting the pin or pins when the hinge elements are aligned (and securing the pins in place, such as via a cotter pin or the like at one or both ends of the pin(s) to preclude accidental dislodging of the pin or pins during transportation). Once hingedly or pivotally attached at the fifth wheel, the trailer can be pivoted or swung upward to a generally vertical orientation along the rear of the fifth wheel (see FIGS. 1 and 2) and can be secured in place in its vertical orientation (such as via locking pins or the like). Optionally, the hinged movement may be controlled via actuators or hydraulic cylinders, or may be limited or controlled via biasing elements or springs or gas springs or the like, to ease the raising of the trailer to its vertical orientation and to limit or slow downward movement of the trailer when unlocked from its vertical orientation.

When the toy hauler trailer is in its stowed vertical orientation, the fifth wheel 10 may be towed or driven to a destination location, such as via the pickup truck or towing vehicle 16. Optionally, the trailer 12 may be configured to cover the rear of the fifth wheel 10. For example, the trailer 12 may enclose an internal storage compartment of the fifth wheel 10 when the trailer 12 is in the stowed orientation. When at the destination location, the forward (upper) end of the trailer 12 may be disconnected or unlocked from the upper rear part of the fifth wheel, whereby the trailer may be pivoted or swung downward (see FIG. 3). The tongue 12d may be left in its retracted position if the trailer is to be used as a ramp (FIG. 4) or may be extended if the trailer is to be towed away from the fifth wheel (FIG. 5).

Figures 1, 2:
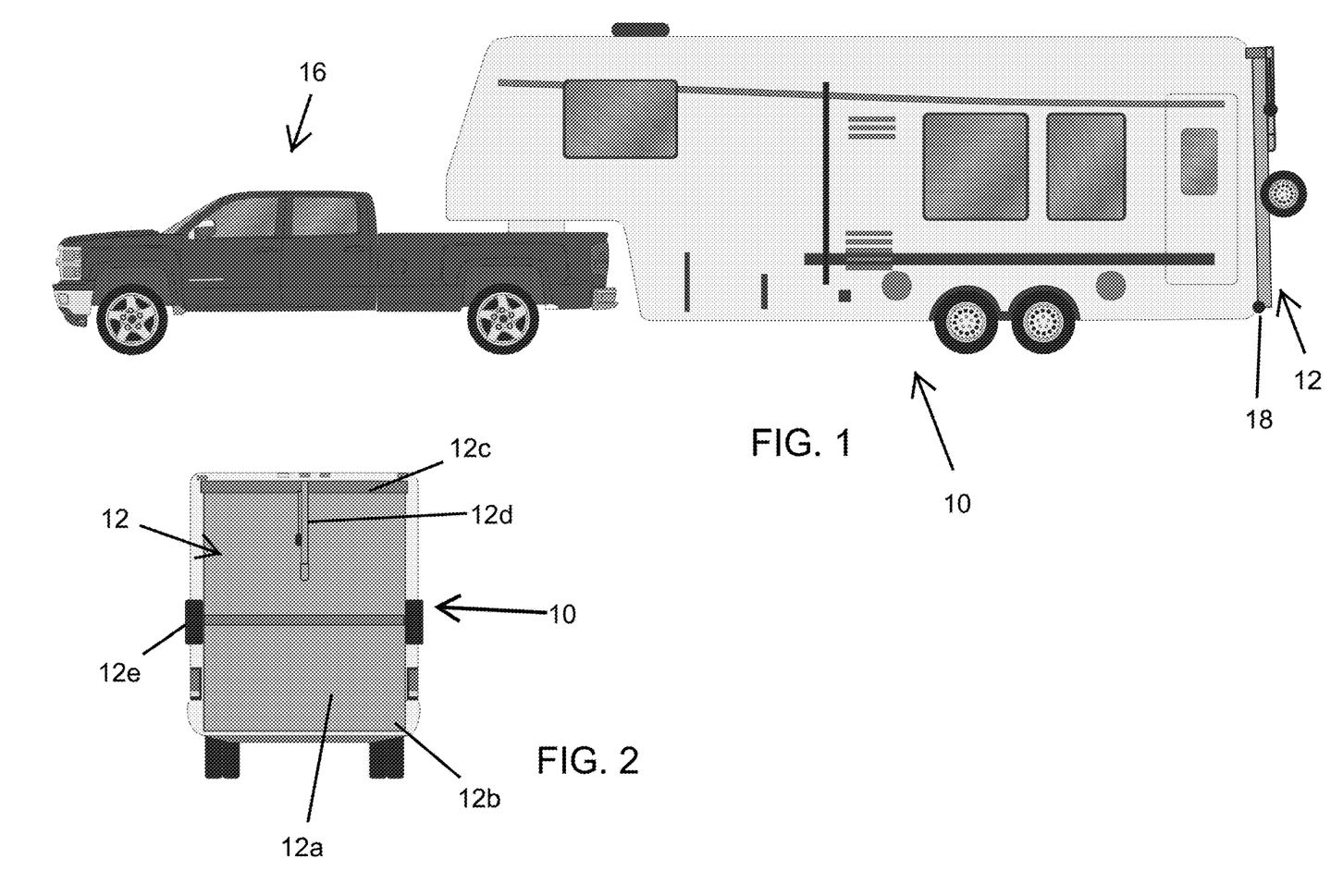
FIG. 1 is a side elevation of a vehicle with a toy hauler trailer in accordance with the present invention, shown with the trailer in its folded-up or stowed position.
FIG. 2 is a rear elevation of the vehicle and trailer of FIG. 1.
Figure 3:
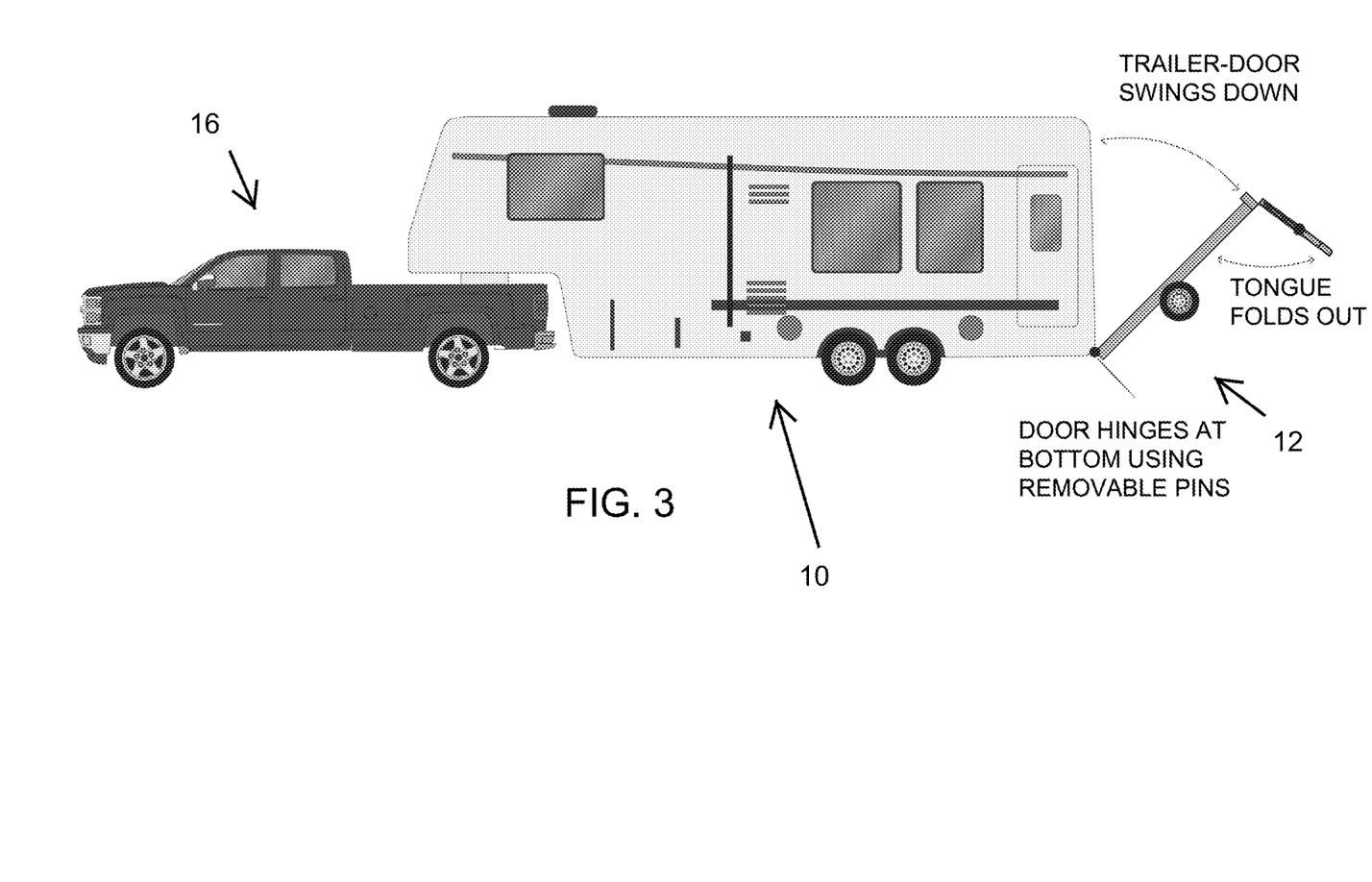
FIG. 3 is another side elevation of the vehicle and trailer of FIG. 1, shown with the trailer being pivoted downward away from the stowed position.
Figure 4:
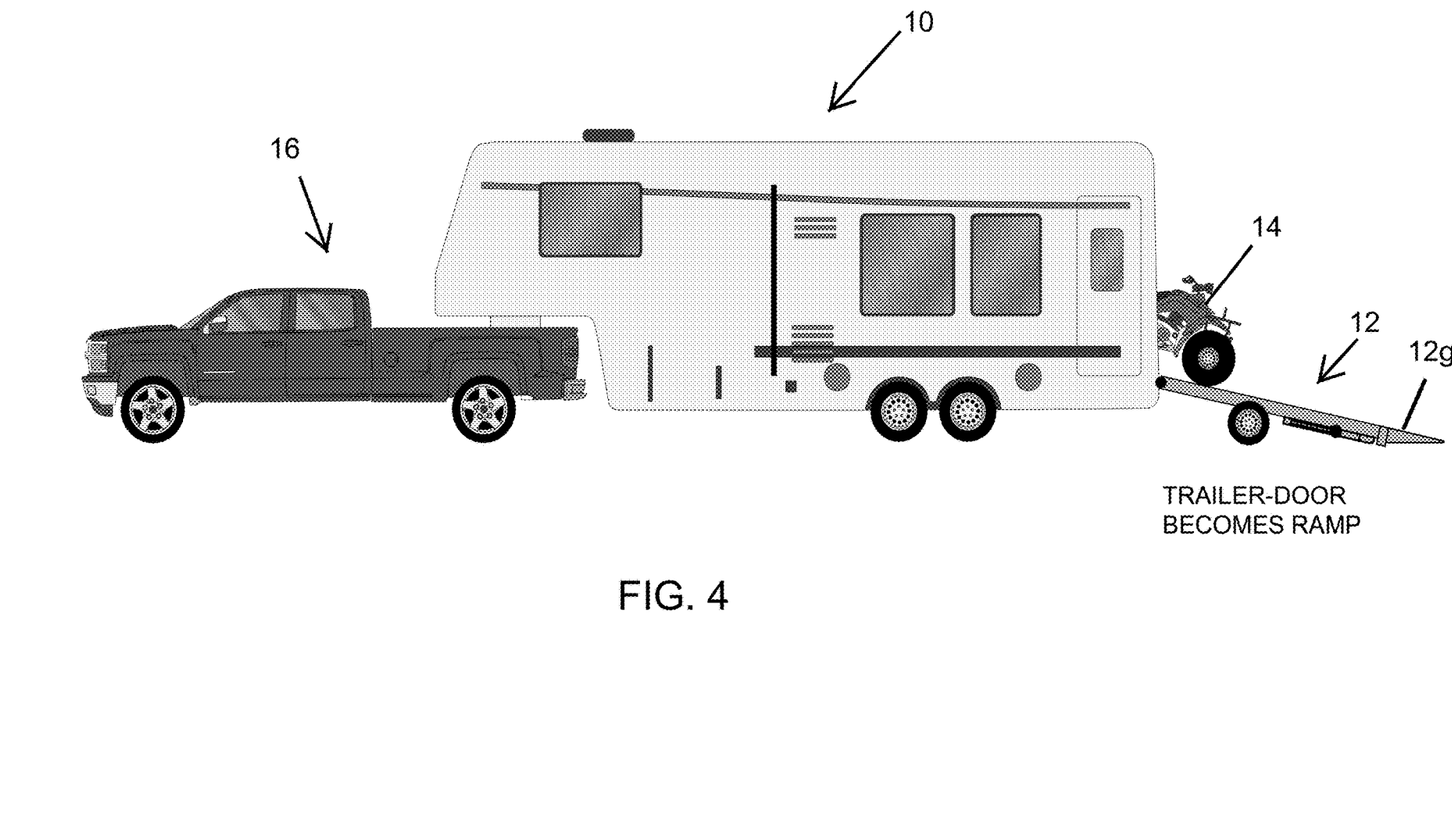
FIG. 4 is another side elevation of the vehicle and trailer of FIG. 1, shown with the trailer pivoted down so as to function as a ramp for an ATV stored in the toy hauler section of the fifth wheel.

As shown in FIG. 4, the trailer tongue may remain unextended (such as disposed along an underside of the trailer body or optionally detached from the trailer body) and the trailer 12 can be pivoted downward to the ramp orientation. Here, the rear of the trailer 12 may be disposed immediately adjacent to an opening to the internal storage compartment of the fifth wheel 10, whereby the rear of the trailer 12 is in communication with the opening such that the ATVs 14 (or other items stowed in the fifth wheel) can be driven or rolled out of the storage compartment of the fifth wheel and onto the trailer body 12a and down onto the ground. In such a ramp orientation, the rear of the trailer may be disconnected from the fifth wheel or otherwise moved up to allow for the front of the trailer body to approach and/or contact the ground so that the ATV may be readily rolled off from (and later on to) the trailer body 12a. Optionally, an additional front ramp element 12g may be attached to the front of the trailer body 12a, and selectively extended from the front of the trailer body to reach the ground when the trailer is tilted to its ramp orientation. Optionally, the trailer wheels and axle may be adjusted relative to the trailer body to allow for the front end of the trailer to drop further downward when the trailer is being used as a ramp as compared to when the trailer is used as a trailer for towing and transporting the ATVs (FIG. 5).

Figure 5:
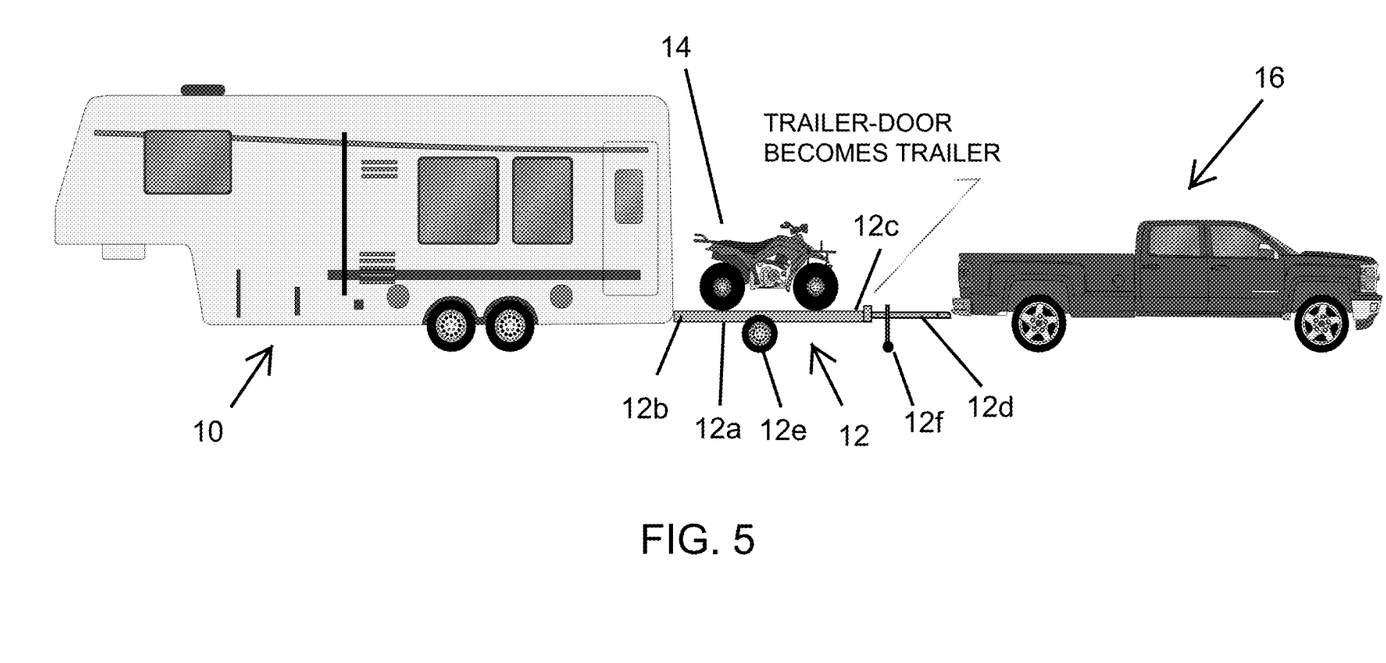
FIG. 5 is another side elevation of the vehicle and trailer of FIG. 1, shown with the tongue of the trailer extended and a towing vehicle connecting to the trailer to tow the trailer away from the fifth wheel when detached therefrom.
Figure 6:
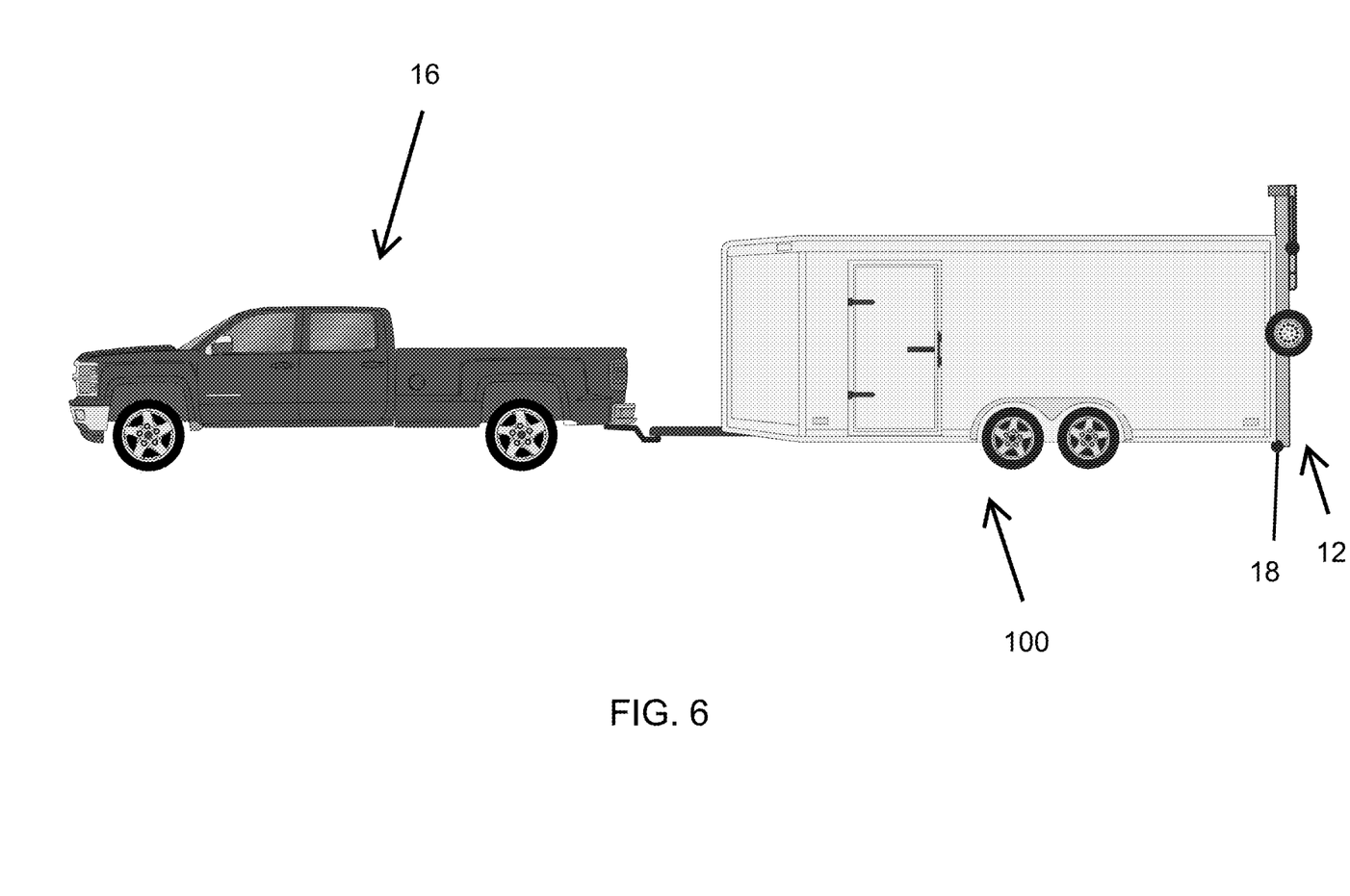
FIG. 6 is a side elevation of a vehicle with a toy hauler trailer in accordance with the present invention, shown with the trailer in its folded-up or stowed position.

As shown in FIG. 5, the trailer 12 may be pivoted at the rear of the fifth wheel 10 to a generally horizontal orientation or non-ramp orientation, and the tongue 12d may be extended and optionally a front support wheel 12f of the trailer may be lowered. The towing vehicle 16 may be disconnected from the forward portion of the fifth wheel 10 and the tongue 12d of the toy hauler trailer 12 may be hitched to the towing vehicle 16. The ATVs (or other vehicles or items stowed in the toy hauler section of the fifth wheel) may be readily rolled or moved onto the trailer body 12a, and the pins at the pivot joint 18 may be removed, such that the trailer 12 is detached from the rear of the fifth wheel and can be towed by the towing vehicle 16 to another destination remote from where the fifth wheel is parked.

The lighting system of the trailer (e.g., brake lights, turn signal indicator lights, reversing lights) may be electrically connected to a vehicle wire harness of the towing vehicle via any known suitable means. Optionally, the trailer lighting system may be in wireless communication with the lighting system or a lighting control of the vehicle, such that the trailer lights may be controlled via wireless communications with a transmitter of the vehicle. The trailer may include a power source or battery to provide power to the lights when actuated via the wireless communication.

With reference to FIGS. 6-10, the trailer 12 is shown in association with another example of a recreational vehicle or suitable vehicle or trailer. Here, the vehicle is a cargo or box trailer 100 having an internal storage compartment for housing the items, such as an ATV 14 or the like. The trailer 12 used in association with the recreational vehicle or cargo trailer 100 of FIGS. 6-10 is constructed and operates in a similar manner to the trailer 12 described above with respect to the fifth wheel 10 of FIGS. 1-5, such that a detailed discussion of the trailer need not be repeated herein.

Figure 7:
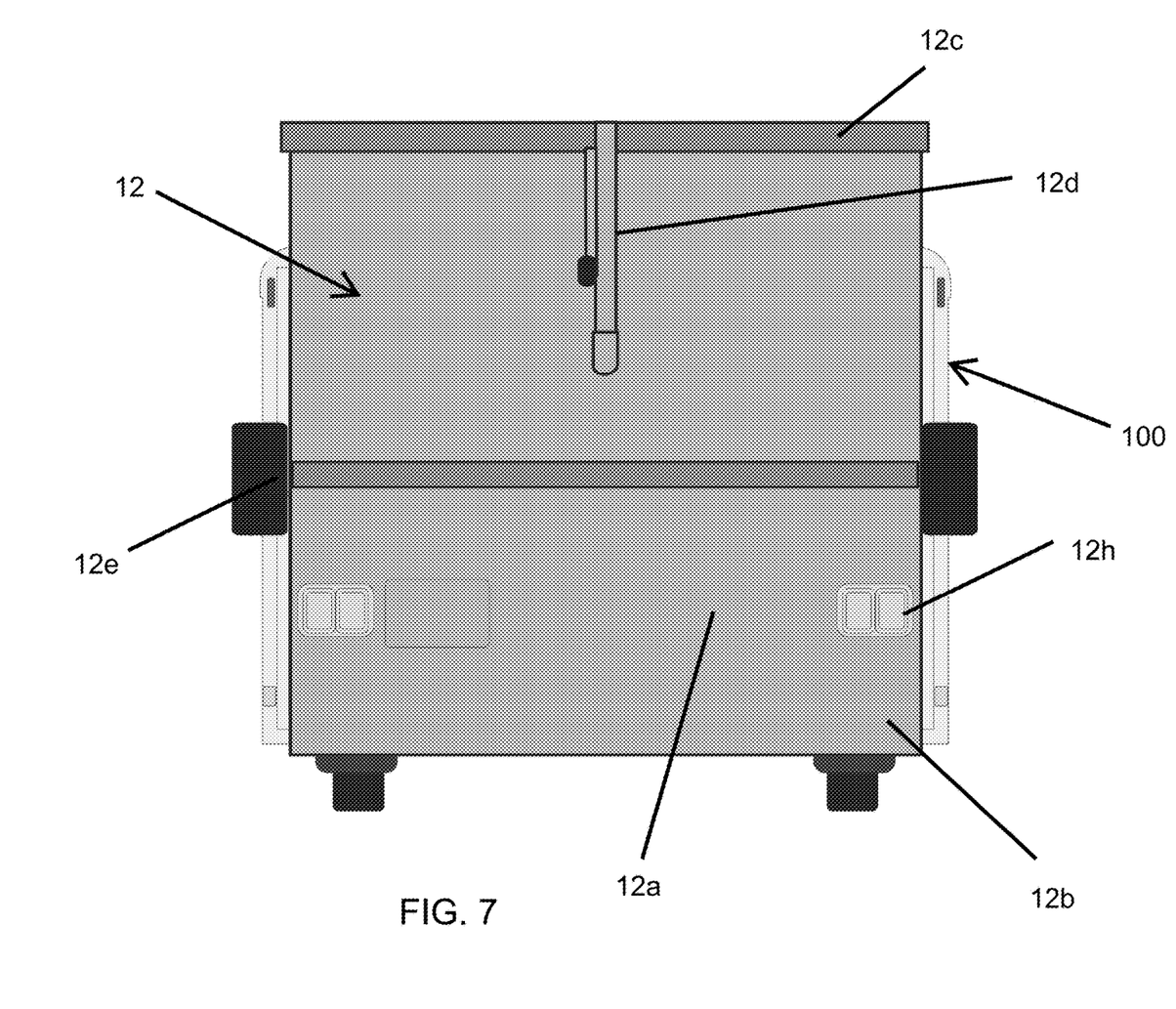
FIG. 7 is a rear elevation of the vehicle and trailer of FIG. 6.
Figure 8:
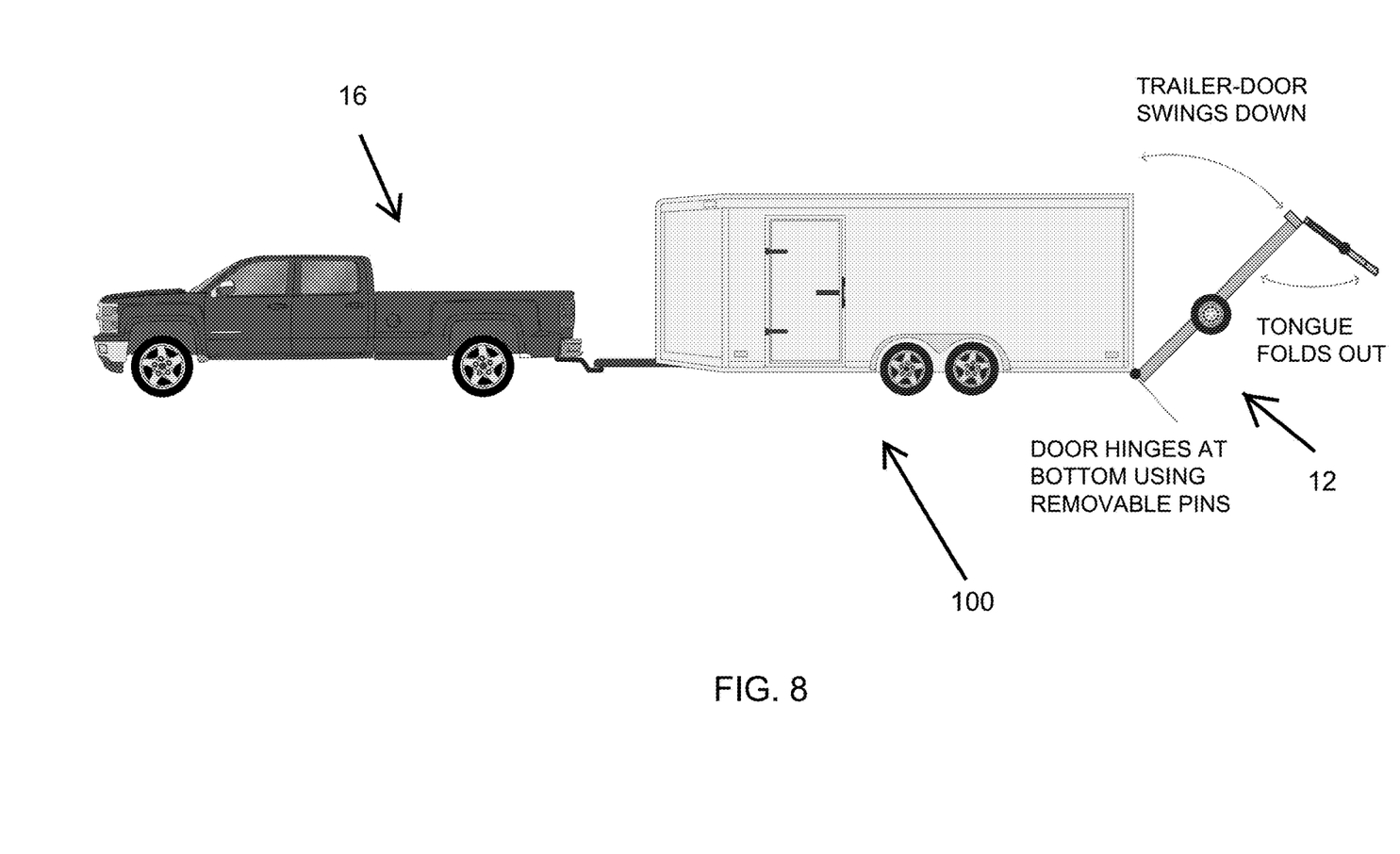
FIG. 8 is another side elevation of the vehicle and trailer of FIG. 6, shown with the trailer being pivoted downward away from the stowed position.
Figure 9:
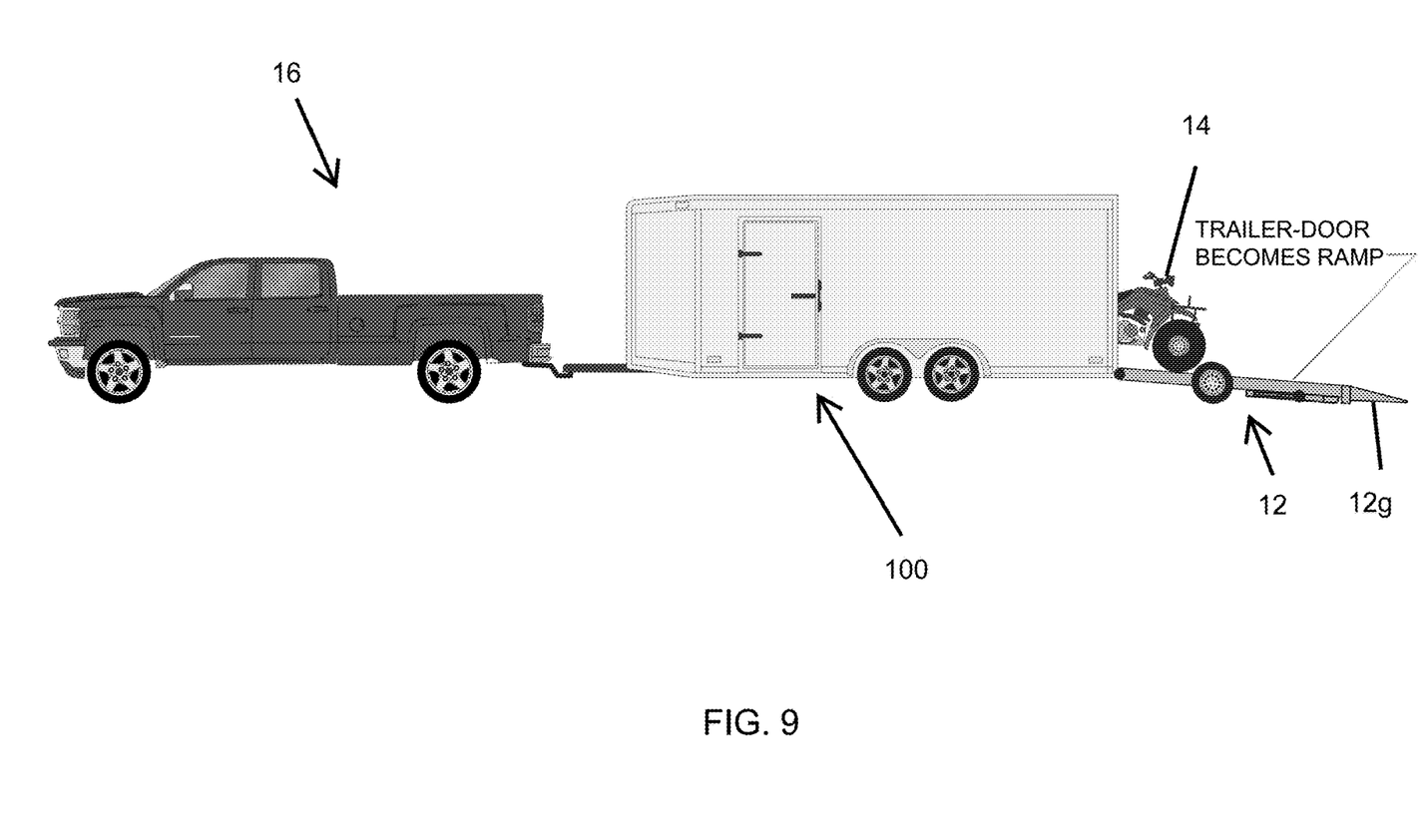
FIG. 9 is another side elevation of the vehicle and trailer of FIG. 6, shown with the trailer pivoted down so as to function as a ramp for an ATV stored in the toy hauler section of the fifth wheel.
Figure 10:
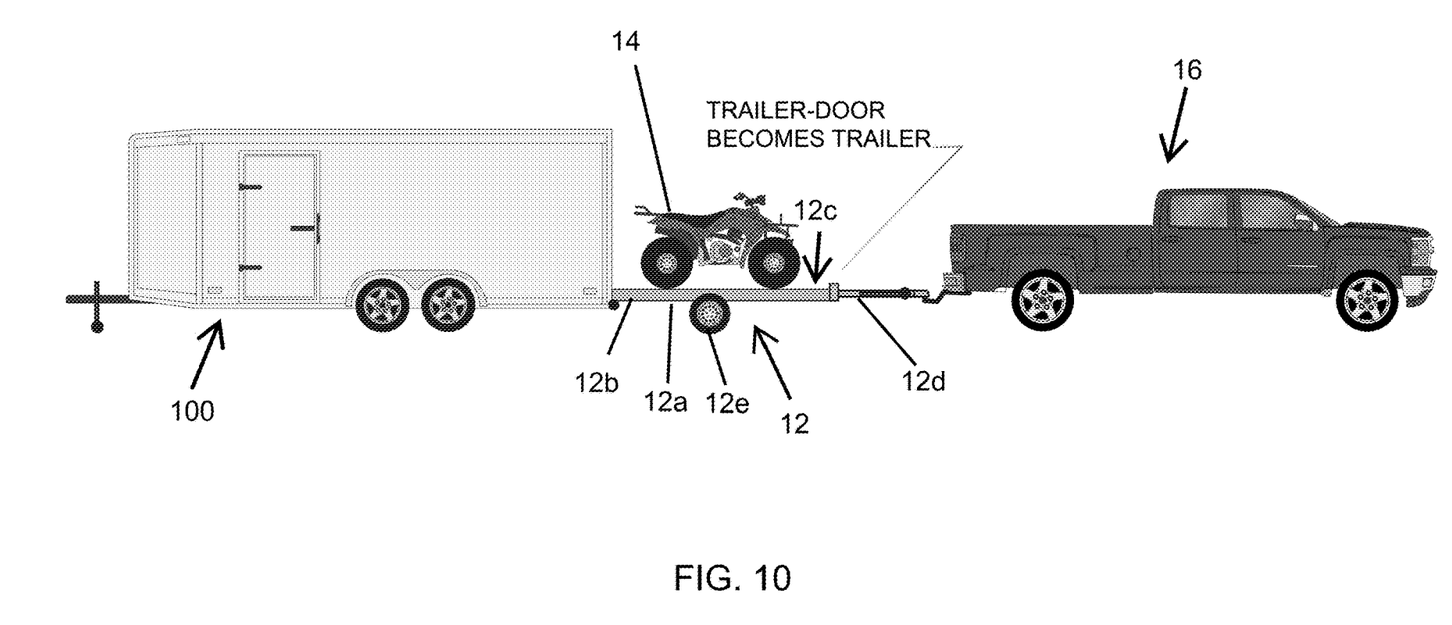
FIG. 10 is another side elevation of the vehicle and trailer of FIG. 6, shown with the tongue of the trailer extended and a towing vehicle connecting to the trailer to tow the trailer away from the fifth wheel when detached therefrom.

Optionally, the underside of the trailer 12 may have brake lights and/or taillights and/or backup lights disposed thereat, whereby the trailer, when detachably and pivotally attached at its rear end to the rear of the vehicle, may be electrically connected to a wire harness of the vehicle such that the lights of the trailer operate in tandem with the lights of the vehicle. For example, the trailer 12 may have a wire harness connector at each end (one by the tongue and one at the rear end), with the rear wire harness connector wired to the lights at the underside of the trailer, and the front or tongue wire harness connector wired to lights at the rear end of the trailer. Optionally, each wire harness connector may power or operate both sets of taillights (at the rear of the trailer and at the underside of the trailer). Optionally, the lights at either location or both locations may be wirelessly controlled. Thus, when the trailer is pivoted to its upright or stowed position (such as shown in FIG. 7), the lights 12h at the underside of the trailer are visible to a person rearward of the vehicle so a driver of a following vehicle can see the trailer lights (since the trailer may, when pivoted upward at the rear of the vehicle, block or conceal the taillights of the vehicle). The underside of the trailer may also have a license plate holder or a license plate holder of the trailer may pivot between a rear or normal trailer position and an underside or stowed trailer position, such that the license plate holder can flip between the positions depending on the orientation or use of the trailer.

Thus, the trailer system of the present invention provides a detachable trailer that detachably attaches at the rear of a fifth wheel or cargo trailer or recreational vehicle or the like and provides a loading/unloading ramp (when pivoted downward) and a towing trailer for ATVs or the like that may be transported in a toy hauler section of the fifth wheel. When in its vertical orientation at the rear of the fifth wheel, the trailer body may function as the rear door or panel of the toy hauler section of the fifth wheel. Optionally, and desirably, the fifth wheel may have a separate door or panel that may be opened when the trailer is lowered and/or removed from the fifth wheel, such that the rear of the fifth wheel may be closed and locked after the ATVs or the like are unloaded and the trailer is towed away from the fifth wheel.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A trailer system for a vehicle having an internal storage compartment, said trailer system comprising:
   a trailer including a trailer body, wheels and a trailer tongue for hitching the trailer to a towing vehicle;
   wherein a rear end of the trailer body is pivotally and detachably attachable at a rear of a vehicle selected from the group consisting of (i) a recreational vehicle, (ii) a fifth wheel trailer and (iii) a cargo trailer;
   wherein, with the rear end of the trailer body detachably attached at the rear of the vehicle, the trailer is pivotable between a stowed position, where the trailer is vertically oriented along the rear of the vehicle, and a lowered position, where the trailer is lowered such that the wheels are at a ground surface;
   wherein, with the rear end of the trailer body detachably attached at the rear of the vehicle, and when the trailer is in the stowed position, a front end of the trailer body is at or near an upper region of the vehicle; and
   wherein, with the rear end of the trailer body detachably attached at the rear of the vehicle, and when the trailer is in the lowered position, the trailer functions as a ramp to allow for items to be unloaded from the vehicle onto the ground surface.

2. The trailer system of claim 1, wherein the trailer tongue is extendable and retractable at the front end of the trailer body, and wherein, with the rear end of the trailer body detachably attached at the rear of the vehicle, and when the trailer is in the stowed position, the trailer tongue is retracted so as to be disposed along the trailer body.

3. The trailer system of claim 2, wherein the trailer tongue is folded along the trailer body when the trailer is in the stowed position.

4. The trailer system of claim 1, wherein the trailer includes a taillight disposed on an underside of the trailer body, and wherein, when the trailer is in the stowed position, the taillight is visible rearward of the vehicle.

5. The trailer system of claim 1, wherein, with the rear end of the trailer body detachably attached at the rear of the vehicle, and when the trailer is in the lowered position, the trailer body is oriented to allow for items to be unloaded from the internal storage compartment of the vehicle onto the trailer body.

6. A trailer system for a vehicle having an internal storage compartment, said trailer system comprising:
   a trailer including a trailer body, wheels and a trailer tongue for hitching the trailer to a towing vehicle;
   wherein a rear end of the trailer body is pivotally and detachably attachable at a rear of a vehicle selected from the group consisting of (i) a recreational vehicle, (ii) a fifth wheel trailer and (iii) a cargo trailer;
   wherein, with the rear end of the trailer body detachably attached at the rear of the vehicle, the trailer is pivotable between a stowed position, where the trailer is vertically oriented along the rear of the vehicle, and a lowered position, where the trailer is lowered such that the wheels are at a ground surface;
   wherein, with the rear end of the trailer body detachably attached at the rear of the vehicle, and when the trailer is in the stowed position, a front end of the trailer body is at or near an upper region of the vehicle; and
   wherein, with the rear end of the trailer body detachably attached at the rear of the vehicle, and when the trailer is in the stowed position, the trailer encloses the internal storage compartment of the vehicle.

7. The trailer system of claim 6, wherein the trailer includes a taillight disposed on an underside of the trailer body, and wherein, when the trailer is in the stowed position, the taillight is visible rearward of the vehicle.

8. A trailer system for a vehicle having an internal storage compartment, said trailer system comprising:
   a trailer including a trailer body, wheels and a trailer tongue for hitching the trailer to a towing vehicle;
   wherein a rear end of the trailer body is pivotally and detachably attachable at a rear of a vehicle selected from the group consisting of (i) a recreational vehicle, (ii) a fifth wheel trailer and (iii) a cargo trailer;
   wherein, with the rear end of the trailer body detachably attached at the rear of the vehicle, the trailer is pivotable between a stowed position, where the trailer is vertically oriented along the rear of the vehicle, and a lowered position, where the trailer is lowered such that the wheels are at a ground surface;
   wherein, with the rear end of the trailer body detachably attached at the rear of the vehicle, and when the trailer is in the lowered position, the rear end of the trailer is immediately adjacent to the internal storage compartment of the vehicle; and
   wherein, with the rear end of the trailer body detachably attached at the rear of the vehicle, and when the trailer is in the lowered position, the trailer functions as a ramp to allow for items to be unloaded from the vehicle onto the ground surface.

9. The trailer system of claim 8, wherein the trailer tongue is extendable and retractable at a front end of the trailer body, and wherein, with the rear end of the trailer body detachably attached at the rear of the vehicle, and when the trailer is in the stowed position, the trailer tongue is retracted so as to be disposed along the trailer body.

10. The trailer system of claim 8, wherein, with the rear end of the trailer body detachably attached at the rear of the vehicle, and when the trailer is in the lowered position, the trailer body is oriented to allow for items to be unloaded from the internal storage compartment of the vehicle onto the trailer body.

11. The trailer system of claim 8, wherein the trailer includes a taillight disposed on an underside of the trailer body, and wherein, when the trailer is in the stowed position, the taillight is visible rearward of the vehicle.

12. The trailer system of claim 8, wherein the trailer tongue is folded along the trailer body when the trailer is in the stowed position.

13. A trailer system for a vehicle having an internal storage compartment, said trailer system comprising:
   a trailer including a trailer body, wheels and a trailer tongue for hitching the trailer to a towing vehicle;
   wherein a rear end of the trailer body is pivotally and detachably attachable at a rear of a vehicle selected from the group consisting of (i) a recreational vehicle, (ii) a fifth wheel trailer and (iii) a cargo trailer;
   wherein, with the rear end of the trailer body detachably attached at the rear of the vehicle, the trailer is pivotable between a stowed position, where the trailer is vertically oriented along the rear of the vehicle, and a lowered position, where the trailer is lowered such that the wheels are at a ground surface;

wherein, with the rear end of the trailer body detachably attached at the rear of the vehicle, and when the trailer is in the lowered position, the rear end of the trailer is immediately adjacent to the internal storage compartment of the vehicle; and wherein, with the rear end of the trailer body detachably attached at the rear of the vehicle, and when the trailer is in the stowed position, the trailer covers the internal storage compartment of the vehicle.

14. The trailer system of claim 13, wherein the trailer includes a taillight disposed on an underside of the trailer body, and wherein, when the trailer is in the stowed position, the taillight is visible rearward of the vehicle.

15. A trailer system for a vehicle having a storage compartment, the trailer system comprising:

a trailer body having a rear end pivotally and detachably attachable to a vehicle selected from the group consisting of (i) a recreational vehicle, (ii) a fifth wheel trailer and (iii) a cargo trailer, wherein the rear end pivotally and detachably attaches to the vehicle adjacent to a storage compartment of the vehicle, and a front end disposed at an opposite end of the trailer body than the rear end and including a trailer tongue;

a pair of wheels attached to the trailer body between the rear end and the front end;

wherein the trailer body, with the rear end detachably attached at the vehicle adjacent to the storage compartment of the vehicle, is pivotable between a stowed position, where the trailer body is positioned adjacent to the storage compartment, and a lowered position, where the wheels of the trailer body are at a ground surface;

wherein, with the rear end detachably attached at the vehicle adjacent to the storage compartment of the vehicle, and when the trailer body is in the lowered position, items can be moved from the storage compartment of the vehicle onto the trailer body; and wherein, with the rear end of the trailer body detachably attached at the vehicle adjacent to the storage compartment of the vehicle, and when the trailer body is in the stowed position, the trailer body covers the storage compartment of the vehicle.

16. The trailer system of claim 15, wherein the trailer tongue is extendable and retractable at the front end of the trailer body, and wherein, with the rear end of the trailer body detachably attached at the vehicle adjacent to the storage compartment of the vehicle, and when the trailer body is in the stowed position, the trailer tongue is retracted so as to be disposed between the rear end and the front end of the trailer body.

17. A trailer system for a vehicle having a storage compartment, the trailer system comprising:

a trailer body having a rear end pivotally and detachably attachable to a vehicle selected from the group consisting of (i) a recreational vehicle, (ii) a fifth wheel trailer and (iii) a cargo trailer, wherein the rear end pivotally and detachably attaches to the vehicle adjacent to a storage compartment of the vehicle, and a front end disposed at an opposite end of the trailer body than the rear end and including a trailer tongue;

a pair of wheels attached to the trailer body between the rear end and the front end;

wherein the trailer body, with the rear end detachably attached at the vehicle adjacent to the storage compartment of the vehicle, is pivotable between a stowed position, where the trailer body is positioned adjacent to the storage compartment, and a lowered position, where the wheels of the trailer body are at a ground surface;

wherein, with the rear end detachably attached at the vehicle adjacent to the storage compartment of the vehicle, and when the trailer body is in the lowered position, items can be moved from the storage compartment of the vehicle onto the trailer body; and wherein, with the rear end of the trailer body detachably attached at the vehicle adjacent to the storage compartment of the vehicle, and when the trailer body is in the lowered position, the trailer body functions as a ramp with the front end of the trailer body disposed adjacent to a ground surface.

18. The trailer system of claim 15, wherein the trailer includes a taillight disposed on an underside of the trailer body, and wherein, when the trailer is in the stowed position, the taillight is visible rearward of the vehicle.

19. The trailer system of claim 15, wherein the lowered position is a use position with the front end of the trailer body spaced from a ground surface and the trailer tongue extended from the front end.

20. The trailer system of claim 17, wherein the trailer includes a taillight disposed on an underside of the trailer body, and wherein, when the trailer is in the stowed position, the taillight is visible rearward of the vehicle.

* * * * *